(12) United States Patent
Jonsson

(10) Patent No.: US 7,476,437 B2
(45) Date of Patent: Jan. 13, 2009

(54) CUTTING TOOL INSERT

(75) Inventor: Anders Jonsson, Gavle (SE)

(73) Assignee: Sandvik Intellectual Property AB, Sandviken (SE)

( * ) Notice: Subject to any disclaimer, the term of this patent is extended or adjusted under 35 U.S.C. 154(b) by 319 days.

(21) Appl. No.: 11/172,881

(22) Filed: Jul. 5, 2005

(65) Prior Publication Data

US 2006/0019120 A1    Jan. 26, 2006

(30) Foreign Application Priority Data

Jul. 5, 2004    (SE)    ................................. 0401741

(51) Int. Cl.
*B23B 27/14*    (2006.01)
(52) U.S. Cl. ........................... 428/212; 51/307; 51/309; 407/119; 428/336; 428/698; 428/701; 428/702
(58) Field of Classification Search ................... 51/307, 51/309; 407/119; 428/212, 336, 698, 701, 428/702
See application file for complete search history.

(56) References Cited

U.S. PATENT DOCUMENTS

| 4,470,895 | A | * | 9/1984 | Coad et al. | ................... 428/698 |
| 4,643,620 | A | * | 2/1987 | Fujii et al. | ................... 407/119 |
| 5,776,588 | A | * | 7/1998 | Moriguchi et al. | .......... 428/701 |
| 5,945,207 | A | * | 8/1999 | Kutscher et al. | ............. 428/698 |
| 6,062,776 | A | * | 5/2000 | Sandman et al. | ............. 428/216 |
| 2002/0187370 | A1 | | 12/2002 | Yamagata et al. | |

FOREIGN PATENT DOCUMENTS

| JP | 60-024371 | * | 2/1985 |
| JP | 08-150502 | * | 6/1996 |
| SU | 751505 | * | 7/1980 |

* cited by examiner

*Primary Examiner*—Archene Turner
(74) *Attorney, Agent, or Firm*—Drinker Biddle & Reath LLP

(57) ABSTRACT

The present invention relates to a cutting tool insert for metal machining comprising a coating comprising at least one wear resistant layer and a substrate and said insert further comprising clearance faces and rake faces intersecting to form cutting edges. The cutting edge has essentially no edge radius, the coating has been removed by grinding on the clearance face from at least close to the cutting edge and that the coating on the rake face has a surface roughness of less than about 0.3 μm over a measured length of 0.25 mm.

6 Claims, 1 Drawing Sheet

CUTTING TOOL INSERT

BACKGROUND OF THE INVENTION

The present invention relates to a coated cutting tool insert with a sharp cutting edge particularly useful for machining of non-ferrous materials such as titanium, aluminium, brass, bronze, plastics etc.

For the machining of metals, cutting tool inserts of cemented carbide having a rake face and clearance faces intersecting to form a cutting edge are used. The cutting edge should be sharp to provide low cutting forces and low energy consumption. However, cemented carbide is a brittle material and for that reason, a sharp cutting edge is generally not strong enough. If it breaks, the cutting forces increase and the surface finish of the machined material will be poor. In order to strengthen the edge it can be rounded to a radius of generally 10-50 μm, or provided with a chamfer or a land. The exact design of the edge depends on the material to be machined and is a compromise between acceptable cutting forces and strength of the edge. Some workpiece materials such as aluminium, etc., require a very sharp edge with minimal edge rounding. An excessively rounded edge can in such materials represent a worn edge and can affect the subsequent wear development. For the machining of such materials, uncoated cemented carbide inserts are generally used. If a coating is applied, the edge will be less sharp. In addition, coated cutting edges require a certain amount of rounding to ensure a satisfactory application of a coating. It is however, a desire to be able to use coated inserts also for the machining of materials requiring sharp cutting edges.

Published U.S. Patent Application 2002/0187370 disclose the grinding of certain amounts of the rake face and flank side of a blade-edge ridge to achieve a surface roughness of 0.2 μm or less over a reference length of 5 μm. It is stated that surface reforming by means of microblasting and ion-beam radiation may also be applied but only grinding and lapping are exemplified.

OBJECTS AND SUMMARY OF THE INVENTION

It is therefore an object of the present invention to provide a method of making coated cemented carbide cutting inserts with a sharp edge.

In one aspect of the invention, there is provided a cutting tool insert for metal machining comprising a substrate, a coating comprising at least one wear resistant layer on the substrate, said insert further comprising clearance faces and rake faces intersecting to form cutting edges, wherein the cutting edge has essentially no edge radius, the coating has been removed by grinding on the clearance face from at least close to the cutting edge and the coating on the rake face has a surface roughness of less than about 0.3 μm over a measured length of 0.25 mm.

In another aspect of the invention, there is provided a method of making a cutting tool insert for metal machining comprising providing a coated cutting tool insert having a coating comprising at least one wear resistant layer and a substrate, said insert further comprising clearance faces and rake faces intersecting to form cutting edges, subjecting at least the rake face of said insert to a blasting operation to obtain a smooth surface with a surface roughness ($R_a$) of less than about 0.3 μm over a measured length of 0.25 mm and subjecting the insert to a peripheral grinding operation with a fine grinding wheel to obtain a cutting edge with essentially no edge radius.

DETAILED DESCRIPTION OF THE PREFERRED EMBODIMENTS OF THE INVENTION

In order to obtain a sharp cutting edge, the coated inserts have to be ground on the clearance face after the coating operation. Initial tests indicated that such a method seemed not to be possible because the grinding operation led to damages to the coating in the edge line and an insufficiently sharp edge. It has, however, surprisingly been found that if the coating is subjected to a final blasting operation at least on the rake face in a surface roughness (Ra) of less than about 0.3 μm over a measured length of 0.25 mm before grinding then the coating remains almost unaffected by the grinding operation resulting in an extremely sharp edge.

In a preferred embodiment, the outermost layer is an alumina layer, preferably an α-alumina layer, with a thickness of from about 1 to about 10 μm, preferably from about 3 to about 6 μm.

In a further preferred embodiment, there is an inner layer of Ti(C,N) between the alumina layer and the substrate with a thickness of from about 1 to about 10 μm, preferably from about 4 to about 7 μm, with columnar grains.

The present invention also relates to a method of making a coated cutting tool insert with extremely sharp edge by providing a coated cutting tool insert subjecting at least the rake face of said insert to a blasting operation to obtain a smooth surface with a surface roughness (Ra) of less than about 0.3 μm over a measured length of 0.25 mm and subjecting the insert to a peripheral grinding operation using a fine grinding disk to obtain a cutting edge with essentially no edge radius.

The invention is additionally illustrated in connection with the following Examples which are to be considered as illustrative of the present invention. It should be understood, however, that the invention is not limited to the specific details of the Examples.

EXAMPLE 1

Invention

Figure 1:
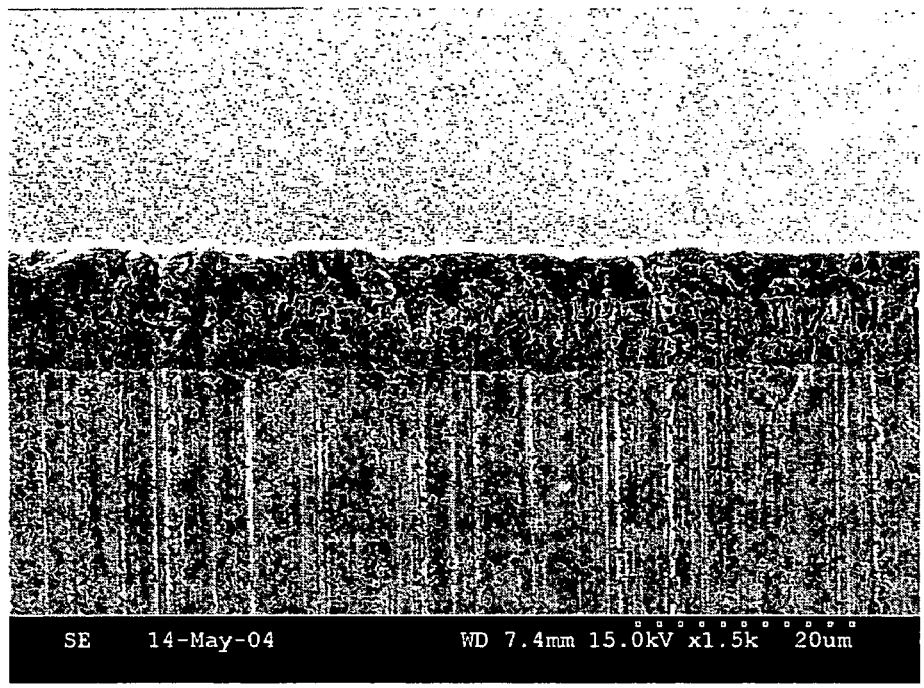
FIG. 1 shows in 1500X in cross section the appearance of a coating of a coated cutting tool insert according to the invention.

Cemented carbide inserts of style N-123L-0800-AM with a composition of 6% Co and as balance WC were coated with a 0.5 μm equiaxed TiCN-layer followed by a 5 μm thick TiCN layer with columnar grains by using MTCVD-technique (process temperature 850° C.). In subsequent process steps during the same coating cycle, a 1 μm thick layer with equiaxed grains of $TiC_xN_yO_z$ (approx. x=0.6, y=0.2 and z=0.2) was deposited followed by a 4 μm thick layer of $\alpha$-$Al_2O_3$ deposited. After coating, the inserts were smoothed by wet blasting to a surface roughness of 0.2 μm over a measured length of 0.25 mm. Finally, the inserts were subjected to a peripheral grinding operation by a diamond disk with 25 μm grain size to obtain a sharp cutting edge. FIG. 1 shows the appearance of the coating essentially undamaged by the grinding operation.

EXAMPLE 2

Comparative

Figure 2:
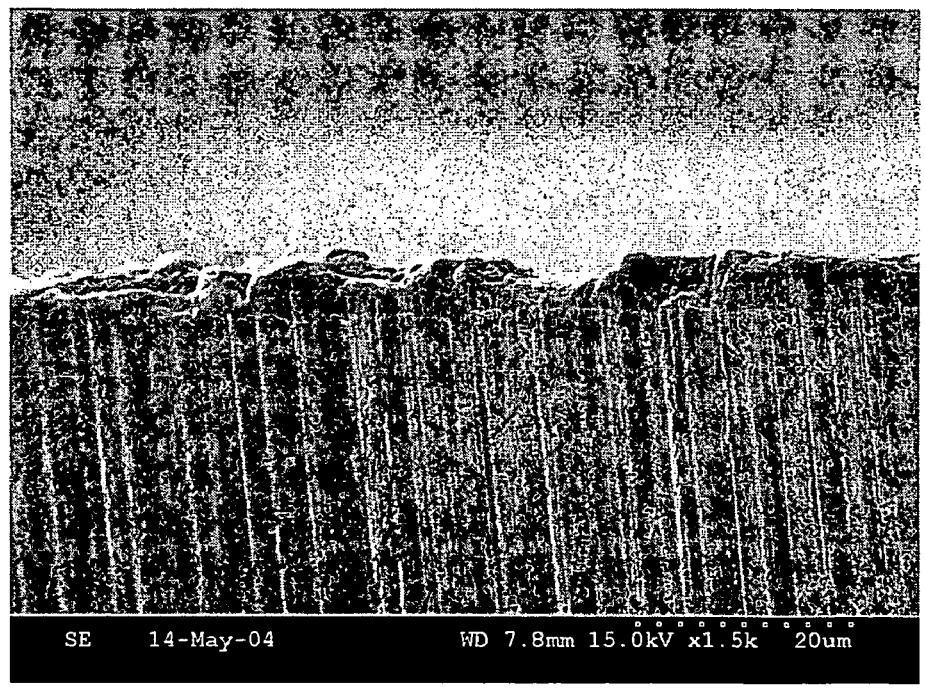
FIG. 2 shows in 1500X in cross section the appearance of a coating of a coated cutting tool insert outside the invention.

Example 1 was repeated without the blasting operation and with a coating of a 0.5 µm equiaxed $TiC_{0.05}N_{0.95}$-layer followed by a 2.6 µm thick $TiC_{0.54}N_{0.46}$-layer, with columnar grains by using MTCVD-technique (temperature 850-885° C. and $CH_3CN$ as the carbon/nitrogen source). In subsequent steps during the same coating cycle, a 1.3 µm thick layer of κ-$Al_2O_3$ was deposited using a temperature 970° C. and a concentration of $H_2S$ dopant of 0.4%. A 0.5 µm layer of TiN was deposited on top according to known CVD-technique. FIG. 2 shows in cross section the appearance of the coating after the peripheral grinding operation. It is apparent that the coating is severely damaged by the grinding leading to an unacceptable finish of the cutting edge.

EXAMPLE 3

Comparative

Example 1 was repeated without the final blasting operation. An appearance of the coating of the edge line similar to that of FIG. 2 was obtained.

What is claimed is:

1. Cutting tool insert for metal machining comprising a substrate, a coating comprising at least one wear resistant layer on the substrate, said insert further comprising clearance faces and rake faces intersecting to form cutting edges, wherein the cutting edge has essentially no edge radius, the coating has been removed by grinding on the clearance face from at least close to the cutting edge and the coating on the rake face has a surface roughness of less than about 0.3 µm over a measured length of 0.25 mm.

2. The cutting tool insert of claim 1 wherein said coating includes an outermost wear resistant layer of alumina with a thickness of from about 2 to about 10 µm.

3. The cutting tool insert of claim 2 wherein said alumina thickness is from about 3 to about 6 µm.

4. The cutting tool insert of claim 2 wherein said alumina layer is an α-alumina layer.

5. The cutting tool insert of claim 2 wherein said coating includes an inner layer of Ti(C,N) between the alumina layer and the substrate with a thickness of from about 2 to about 10 µm with columnar grains.

6. The cutting tool insert of claim 5 wherein the thickness of said inner layer is from about 4 to about 7 µm.

* * * * *